Figure 1:
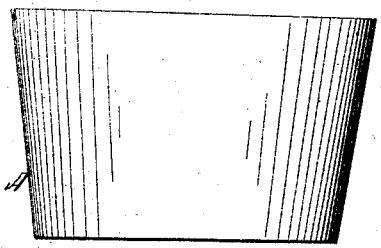

J. Hively.
Plant Protector.

Nº 26,849.  Patented Jan. 17, 1860.

Witnesses:
Geo. Orum
C. W. Griffith

Inventor.
John Hively

UNITED STATES PATENT OFFICE.

JOHN HIVELY, OF DAYTON, OHIO.

IMPROVEMENT IN FLOWER-POTS.

Specification forming part of Letters Patent No. 26,819, dated January 17, 1860.

*To all whom it may concern:*

Be it known that I, JOHN HIVELY, of Dayton, in the county of Montgomery and State of Ohio, have invented a new, useful, and Improved Pot and Protector for Plants; and I do hereby declare that the same is described and represented in the following specification and drawings.

To enable others skilled in the art to make and use my invention, I will proceed to describe its construction and the mode of using it, referring to the drawings, in which the same letters indicate like parts in each of the figures.

Figure 4:
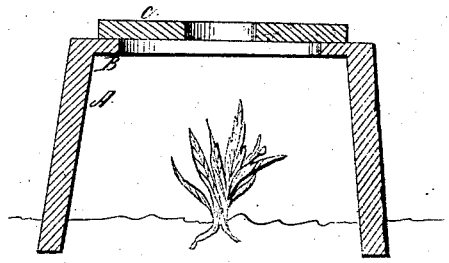
Figure 2:
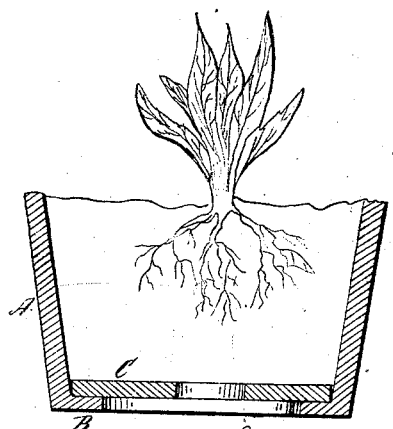
Figure 5:
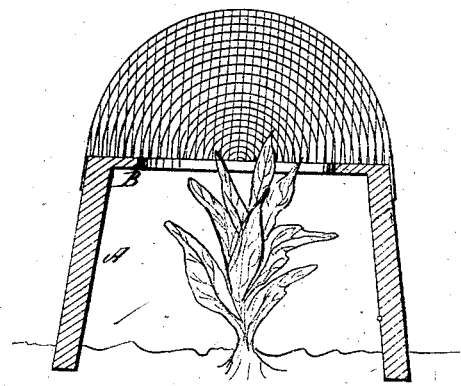
Figure 3:
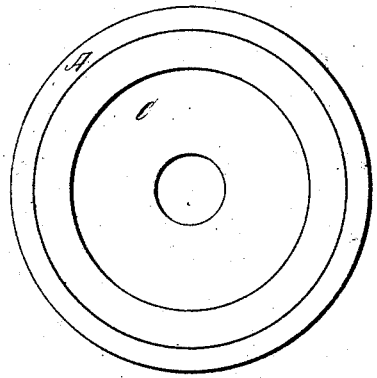
Figure 6:
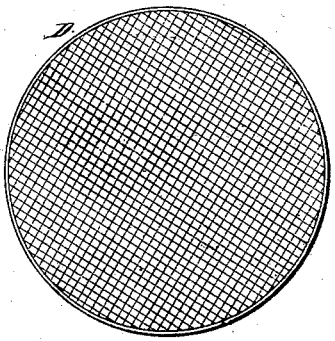

Figure 1 is an elevation of my improved pot and protector. Fig. 2 is a section cut perpendicularly through the center. Fig. 3 is a plan or top view. Fig. 4 shows the pot reversed for a protector. Fig. 5 shows the pot as a protector, in section, with a wire screen applied to it. Fig. 6 is a plan of the screen to protect the plant.

The nature of my invention consists in the combination of a pot with an open bottom, provided with a flange on the inside and a loose removable bottom to lift the earth from the pot, and a wire screen fitted to the pot, so as to protect the young plant, as will be hereinafter described.

In the accompanying drawings, A is a pot mand of burned clay, stone, or other earthen materials in the form shown in the drawings—that is, it is made conical, larger at the top than the bottom, so that the earth will come out readily when the plant started in it is to be set in the ground. This pot has a narrow rim, B, around its lower edge on the inside, to hold the loose removable bottom C, which is laid in on the rim B before the pot is filled with earth in which the seed is to be planted, or the plant set which is to grow in the pot.

My improved pot is designed and admirably adapted to the wants of market-gardeners, as they can plant the seeds of vegetables in these pots and give them an early start in a hot-house, and, when the season has advanced so that they will grow in the open air, transplant them into the open ground by placing the fingers across the top of the pot each side of the stem of the plant. Then turn the pot bottom upward over the fingers, and with the forefinger of the other hand press down the loose bottom, C, and raise the pot at the same time with the thumb and middle fingers, so as to lift the pot from the earth containing the roots of the plant, and then place the fingers across the loose bottom and hold it against the ball of earth around the roots, and turn the plant up and place it in the hole previously prepared for it in the ground. Then pull the loose bottom out from under it and level and press the earth properly around the plant. After the plant is set in the open ground I turn the pot bottom upward and place it over the plant to protect it from the burning sun for a few days, and press the edge of the pot into the ground a little way, so as to protect the plant from surface-worms, and apply a wire-screen, D, to the upper end of the pot to protect the plant from bugs, which wire screen lessens the force of the sun on the plant while it allows of a free circulation of air, which is so necessary for the young plant in order to produce a vigorous growth, and prepare it for the removal of the screen and pot. The screen D is made of wire woven and pressed or hammered into a hemispherical form, and a strip of sheet metal fitted to the pot is soldered to its edge, so that it can be readily applied to or removed from the pot. The screens may be made of galvanized wire, or dipped into hot gas-tar, or they may be painted or varnished to prevent them from rusting.

By using the pots and screens to protect the young plants after they are set in the ground the gardener may set his plants in the ground much earlier in the season than he could safely do without them, for if the weather is so cold that he apprehends a frost a piece of paper may be laid over the opening in the pot and the loose bottom laid on it, or the wire screen put on to hold the paper cover in its place, which will be sufficient to protect the plant from a pretty hard frost, one that would destroy the exposed parts of the plants were it not for the protection of the pot.

From the experience I have had with these pots and screens the past season I find that I can get mellons, cucumbers, citron, &c., four or five weeks earlier, and tomatoes and cabbages, &c., three weeks earlier, than by the common mode of starting early vegetables heretofore practiced.

My improved pots may be made of metal or such other materials as may be preferred, and they may be made either round, square, or in such form as may be desirable, and of such sizes as will adapt them to the plants for which they are to be used.

I believe I have described and represented my improved pot and screen for plants so as to enable any person skilled in the art to make and use them. I will now state what I desire to secure by Letters Patent, to wit:

The combination of the pot A, flange B, and removable bottom C, either with or without the screen D, for the purposes set forth, substantially as described.

JOHN HIVELY.

Witnesses:
GEO. OWEN,
C. W. GRIFFITH.